Aug. 17, 1965   R. K. CHARLESWORTH ETAL   3,201,365
RECOVERING POLYMER FROM DILUTE POLYMER SOLUTIONS
Filed June 26, 1961

INVENTORS.
Robert K. Charlesworth
Stanley A. Murdock
Kernal Glenn Shaw
BY Richard D. Waterman
AGENT

3,201,365
RECOVERING POLYMER FROM DILUTE POLYMER SOLUTIONS

Robert K. Charlesworth, Walnut Creek, and Stanley A. Murdock and Kernal Glenn Shaw, Concord, Calif., assignors to The Dow Chemical Company, Midland, Mich., a corporation of Delaware
Filed June 26, 1961, Ser. No. 119,531
12 Claims. (Cl. 260—34.2)

This invention relates to a method for recovering polymeric material that is dissolved in dilute concentrations in a solvent for the polymeric material. As a particular aspect, the invention relates to a continuous separation of a polyolefin dissolved in dilute concentrations in a hydrocarbon solvent for the polyolefin wherein the solvent is vaporized without creating conditions of unstable flow of the polymer solution through the vaporization chamber.

Of the many methods of polymerizing aliphatic and cyclic olefins and other thermoplastic polymer-forming monomers to high molecular weight polymers, several employ a suitable solvent or suspending vehicle for the polymer to assist in the polymerization and subsequent treating and handling operations. Ordinarily, and frequently, the resulting polymer is concentrated by removal of solvent and/or by reduction of its solvency for the polymer, as by cooling, evaporation of solvent, or the like. Thereafter it is handled and transported in slurry form prior to the final separation of polymer solids from the slurry by physical separation means, such as filtration.

It would be of advantage, and it is among the primary concerns of the instant invention, to provide a means whereby, when utilizing solution polymerization, the polymer can be kept in solution or at least in liquid form throughout from the polymerization step to the finished polymer. The advantages and related benefits of this type of process are readily apparent to one familar with the art when account is taken of the costly equipment required for slurry and solids handling, not to mention the additional handling treatments involved. Further, there are obvious advantages from an operational standpoint in avoiding the difficulties encountered with most solids handling equipment compared to liquid systems. For instance, such problems as plugging and general abrasion are encountered in closed solids handling systems, as well as fly ash or air contamination and detrimental effects on bearings and other moving machinery parts in open solids handling systems.

With solution polymerization and handling, as with any other polymer system, the final processing is usually one of recovering or obtaining the finished polymer in one form or another. This recovery can be handled in one of several ways, but in instances wherein dilute polymer solutions are to be processed, the solvent removal becomes significantly less than straight forward. The extreme changes that occur in solution properties with small changes in polymer concentrations create troublesome control problems which are ultimately reflected in the quality of the polymer product. In this connection, one of the more important criticalities of the recovered polymer is the level of residual solvent and other volatiles. This level must necessarily be low else to create serious problems through the tendency of the volatiles to "bleed" to the surface of the normally solid polymer and interfere with subsequent handling, treating and processing, and detracting from aesthetic characteristics such as by imparting a greasy feeling to the surface. Those volatiles that do not bleed to the surface and are entrapped in the polymer mass generate bubbles and imperfections in articles fabricated from the polymer.

As a corollary and attendant problem in separating the solvent from the polymer, which, in most all instances requires heating the solution in one fashion or another, is the thermal induced degradation of the polymer. This degradation is apparently a function of both temperature level and residence time taken jointly.

One method that may be beneficially employed to separate solvent from polymer is to pass the polymer solution through the tubes of a multiple tube evaporator to vaporize at least a portion of the solvent and then discharge the mixture of polymer solution and vaporized solvent into a receiver from which the vapor is withdrawn. If necessary, this operation can be repeated in several stages until all the solvent is removed. In each subsequent stage a more concentrated polymer solution is thus treated. For economical reasons, and to elminate prolonged heating of the polymer solutions for reasons indicated in the foregoing, it is desirable and preferable that evaporation of the solvent and recovery of a polymer essentially completely free of volatiles be carried out in as few stages as possible and advantageously in two stages.

It has been found, however, that when this method is utilized to recover polymer from dilute polymer solutions the polymer product is often non-uniform in composition and frequently unacceptable due to the high level of volatiles remaining in the polymer. This is thought to be caused by the sensitive polymer solution properties, as previously indicated. For instance, solution boiling point and solution viscosity exhibit rapid deviation with relatively minor changes in polymer concentration. These properties, in turn, effect heat transfer coefficients in a manner such that the analysis of the results is one of additive complications which induces unstable flow conditions of the polymer solution through the devolatilizer tubes.

This phenomenon of flow instability exhibits itself in "channeling" of the solution through the tubes and in non-uniform heating and devolatilization of portions of the polymer solution. Thus, if flow becomes unstable under design conditions and channeling results, the consequence is that the devolatilizer unit cannot be operated at design capacity and product quality is jeopardized.

A further factor contributing to unstable flow is the tendency of two-phase systems to exhibit "slugging" or surging of the solution through the tubes leading to the same detrimental effects that occur with channeling.

The causes of unstable flow are not fully understood, but in general, unstable flow is quite likely to occur in a multi-passage devolatilizer when a maximum is prevalent in the curve obtained from plotting pressure drop through a single passage or tube versus flow rate through the passage or tube. What happens, then, is that for the same pressure drop different flow rates may be occurring in different tubes.

Analyzed qualitatively, the occurrence of these unpredictable flow rates when devolatilizing relatively dilute polymer solutions might be made more clear by considering what possibly may be happening as flow rate is increased through a single tube. At very low feed rates relatively complete and rapid vaporization of the solvent can occur such that the feed can be assumed to be essentially devolatilized polymer, and the pressure drop-flow rate curve approximates that for devolatilized polymer. As the feed rate is increased, less solvent per pound of feed is vaporized with a corresponding decrease in viscosity until the pressure drop-flow rate curve for the feed solution is approached. Thus, it is possible for a transition of flow to occur at intermediate flow rates. When channeling develops a few tubes or passages undoubtedly handle the majority of flow with a consequent increase in the volatile content of the product.

Heretofore, the answer to this perplexing situation has been to operate at relatively low feed rates so that the resulting pressure drop is characteristic of but a single flow rate in the tubes. This is unsatisfactory for obvious reasons among which are the low capacities and unfavorable economics, and the long residence times at high temperatures leading to polymer degradation.

It is among the principal objects of this invention to provide a highly advantageous and efficient method for recovering a thermoplastic polymer from a dilute polymer solution employing a multi-passage down-flow devolatilizer. It is also an object of the invention to recover a thermoplastic polymer from a dilute polymer solution whereby the polymer is maintained in solution or liquid form throughout the recovery operation, and the recovered polymer is essentially completely free of solvent or volatile material.

All of the foregoing and still further objects and advantages are readily achieved by practice of and in accordance with the present invention wherein a solution (or equally applicable, a suspension or slurry) of a thermoplastic polymer dissolved in a solvent for the polymer in relatively dilute concentrations is first heated under pressure in a closed liquid-filled space and then flashed into the head of an essentially vertical multi-passage heating zone of a devolatilizer, said zone being maintained at a temperature above the vaporization temperature of the solvent at the pressure in the zone and below the temperature at which any substantial polymer decomposition will occur; passing the flashed polymer solution through the heating zone and discharging the solution into a receiver maintained at a lower pressure than the inlet to the multi-passage heating zone; withdrawing vaporized solvent from said receiver; forwarding the partially devolatilized solution to the top of a second essentially vertical multi-passage heating zone of a second devolatilizer, said zone being maintained at a temperature above the vaporization temperature of the solvent at the pressure in said second zone and below the temperature at which any substantial polymer decomposition will occur; passing the polymer solution through said second heating zone and discharging the solution into a second receiver maintained at a lower pressure than the inlet pressure of said second zone; withdrawing vaporized solvent from said second receiver; withdrawing from said second zone said polymer in molten form essentially completely free of said solvent; and subsequently cooling said polymer to a normal temperature to solidify the polymer.

Thus, the present invention takes advantage of the finding that essentially completely volatile-free polymer can be efficiently and uniformly recovered from dilute polymer solutions (or suspensions, slurries and the like) employing as few as two stages of a multi-passage devolatilizer, by feeding to the entrance of the multi-passage heating zone of the first stage devolatilizer a two-phase mixture, i.e., vapor and liquid, consisting of vaporized solvent (or volatile inert carrier), liquid solvent and liquid polymer.

Yet additional objects and advantages of the invention, and its numerous cognate benefits and features, are even more apparent and readily manifest in and by the ensuing description and specification, taken in conjunction with the accompanying drawing wherein.

Figure 1:
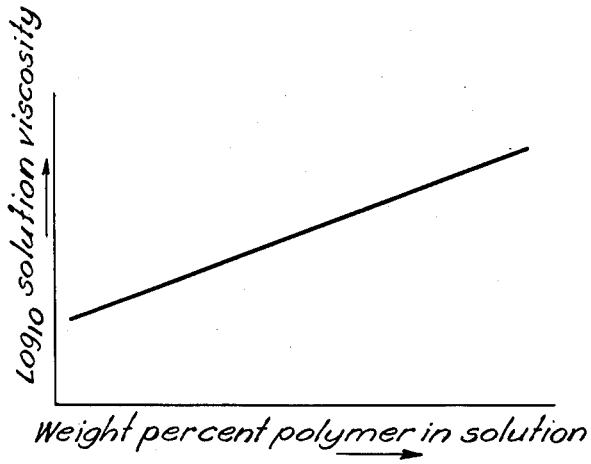
FIGURE 1 is a representative graph illustrating the effects of polymer concentration on viscosity of a solution of polypropylene in xylene.

The problems in obtaining and maintaining stable flow is made more clear by referring to FIGURE 1 wherein the viscosity of a solution of polypropylene in xylene is indicated as a function of polymer concentration in the solution. From this it is evident that the viscosity of the solution exhibits rather rapid changes with relatively small changes in polymer concentration. This is true throughout the wide range of concentrations that are encountered while devolatilizing the polymer solutions. In this connection, the problem of unstable flow is compounded by the large viscosity change occurring during the process which may be on the order of a ratio of 1:10,000.

Figure 2:
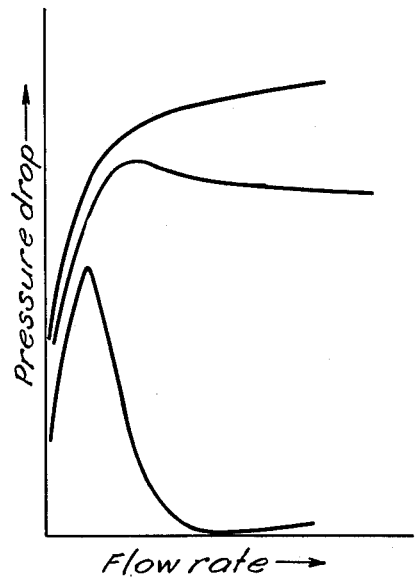
FIGURE 2 is a representative graph illustrating the effects of flow rate on pressure drop through a single passage when vaporizing a solution of polypropylene in xylene.

Referring to FIGURE 2, the two lower curves of this figure show the erratic behavior and variable pressure drop, or stated otherwise, variable flow rate, that is usually evidenced when unstable flow occurs in a multi-passage heating zone of a devolatilizer. Thus, when unstable flow or channeling occurs, pressure drop-flow rate curves are obtained of the general shape shown in the two lower curves of FIGURE 2. Literally interpreted, for the same pressure drop two or more flow rates may be occurring in the tubes or passages. When optimum devolatilizing conditions are maintained, i.e., stable flow, a pressure drop-flow rate curve is obtained of the general shape shown in the upper curve of FIGURE 2. When operation follows the upper curve, then, only one pressure drop is obtained for each flow rate.

Figure 3:
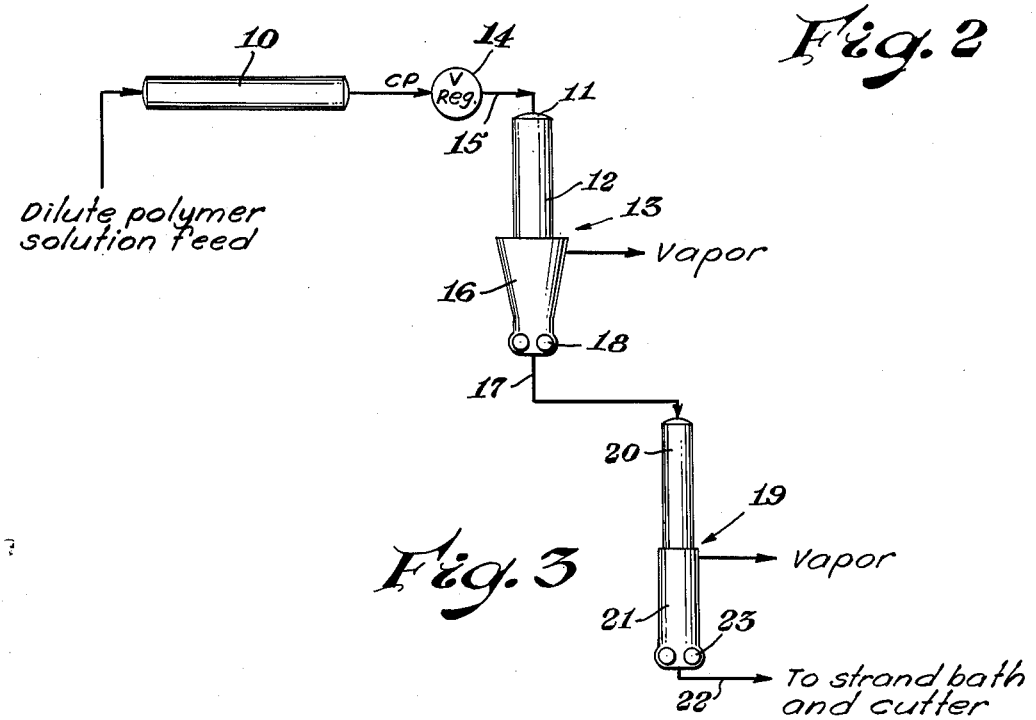
FIGURE 3 is a schematic diagram illustrating the process of the invention.

With reference to FIGURE 3 of the drawing, there is illustrated one means of carrying out the process of the present invention. As shown, a dilute polymer solution feed stream of a thermoplastic polymer dissolved in a suitable solvent is heated under pressure in preheater 10 which can conveniently be a tube and shell heat exchanger. The tubes or chamber of the preheater containing the polymer solution is maintained liquid filled so that only a single phase exists. The temperature of the preheater is maintained at a temperature above the vaporization temperature of the solvent at the pressure in the head space 11 above the multi-passage heating zone 12 of the first stage evaporator or devolatilizer 13. The pressure in preheater 10 is controlled by needle valve 14 through which the heated dilute polymer solution is flashed to a lower pressure on the down-stream side of the valve. The resulting two-phase system 15, consisting of vapor and liquor, much like a foam, is then fed to head-space 11 and then through the multi-passage heating zone 12. The temperature of heating zone 12 is maintained above the vaporization temperature of the solvent at the pressure in the zone and above the melting point of the particular polymer involved, but preferably below the temperature at which any substantial polymer decomposition will occur. The passages of the heating zone 12 may have any of a number of geometrical shapes. For instance, they may be rectangular in shape approaching a thin slot, or they may be of a round tubular configuration. For convenience of fabrication, the round tubular shape is preferred fabricated in a tube sheet as might be found in a conventional tube and shell heat exchanger.

The temperatures of the preheater and the heating zone are usually maintained by a suitable heating medium, e.g., a vapor condensing on the outside of the passages or tubes. For instance, "Dowtherm E" vapor (a specially treated grade of o-dichlorobenzene, B.P. 352° F.) condensing on the tube walls may be beneficially employed.

The vapor-liquid mixture 15, after passing through the heating zone 12, is discharged into a receiving chamber 16. Vaporized solvent (as well as any other volatiles) is withdrawn from chamber 16 and transported to a solvent recovery system (not shown). The partially devolatilized polymer solution 17 is pumped from receiving chamber 16 through pump 18 to the top of second stage devolatilizer 19. (In some operations, the polymer solution 17 may not strictly be a solution at this point, instead it may resemble a plastified mass containing residual but significant amounts of solvent. However, for sake of convenience, it will be herein referred to as a solution.)

Devolatilizer 19 is similar in construction and operation to devolatilizer 13. Polymer solution 17 is passed through multi-passage heating zone 20, which is maintained at a temperature above the vaporization temperature of the solvent at the pressure in heating zone 20 and above the melting point of the polymer, but below the temperature at which any substantial polymer decomposition will occur, and then discharged into receiving chamber 21. Vaporized solvent (as well as any other volatiles) is withdrawn from chamber 21 and transported to a solvent recovery system (not shown). The previously dissolved polymer 22, obtained in molten form in the bottom of chamber 21 essentially completely free of solvent (and other volatiles), is pumped from chamber 21 through pump 23 and subsequently extruded and solidified in strandular form into an aqueous bath and cut into pellets (not shown).

The present inventive process is applicable for treating and recovering any thermoplastic polymer from dilute solutions (suspensions or slurries) of the polymer wherein the solvent has a significantly lower boiling point than the polymer. For example, polystyrene in benzene, polyvinyl chloride in trichloroethylene, etc. are profitably treated in accordance with the invention. Advantageously, and beneficially, dilute polymer solutions of a polymerized aliphtic or cylic olefin, including both mono- and diolefins, such as ethylene, propylene, butylene, and butadiene (including polymerizable mixtures thereof) and particularly 1-olefins, which are so designated because of their terminally unsaturated configuration, are treated in accordance with the invention.

In a preferred embodiment of the invention, solutions are treated containing the polyolefin polymers prepared by polymerization of monoolefinic aliphatic olefin monomers, such as ethylene, propylene, butylene and so forth (including polymerizable mixtures thereof) that contain from 2 to about 8 carbon atoms. These polymers of ethylene, propylene and other non-aromatic hydrocarbon olefins may be obtained under relatively low pressures of 1 to 100 atmospheres using such catalysts for polymerizing the ethylene or other olefin as mixtures of strong reducing agents and compounds of Group IV–B, V–B and VI–B metals of the Periodic System; chromium oxide on silicated alumina; hexavalent molybdenum compounds; and charcoal supported nickel-cobalt. These polymer solutions are frequently obtained by polymerizing the monoolefins in an inert solvent, preferably a hydrocarbon solvent, which may suitably be a 3 to 12 carbon atom paraffinic or aromatic hydrocarbon solvent, such as hexane, cyclohexane and advantageously benzene, toluene and xylene. The polymerization reactor effluent will usually contain polymer, solvent, unreacted monomer and suspended catalyst. A normal sequence of processing may entail flashing off unreacted monomer followed by filtering out catalyst which leaves a solution of polymer in solvent. This solution, then, is preferentially treated according to the herein described invention to recover the polymer. However, it is to be understood that the invention is applicable to recovering polymer from relatively dilute polymer solutions regardless of the source of the solution.

Polymer solutions containing from about 0.5 to 30 weight percent polymer solids are advantageously treated in accordance with the invention. Ordinarily, the problems of unstable flow are not encountered or at least are not as prevalent and detrimental in polymer solutions having concentrations of about 30 percent or more polymer dissolved therein. However, the present treatment can be employed and is effective for recovering polymer from any solution concentration. As indicated, solutions of polyolefins from polymerized monoolefins are beneficially treated according to the instant invention. These solutions when polymerized as hereinbefore described usually contain from about 0.5 to 20 or so weight percent, frequently from about 5 to 20 and advantageously about 7 to 11 weight percent dissolved polymer solids. Thus, dilute polymer solutions in these later mentioned concentration ranges are preferably treated by the present method for recovery of essentially volatile-free polymer.

The temperature and pressure at which the preheater, and the devolatilizers are operated and the temperature and pressure of the polymer solution after flashing will depend on the concentration of polymer in the solution feed, and the particular polymer and solvent of the solution. These conditions can readily be determined by analyzing one of several characteristics such as product quality, extreme pressure fluctuations in the devolatilizer, and the shape of the flow rate-pressure drop curve.

Generally, the upper temperature limit throughout the processing is controlled by the polymer stability, that is, the temperature at which substantial polymer degradation or decomposition will occur. The lower temperature limit is controlled by the vaporization temperature of the solvent at the particular pressures involved, the temperature at which the polymer is no longer soluble in the solvent and the melting point of the polymer involved. It is desirable that the temperature be maintained above the polymer melting point.

When treating the indicated dilute polymer solutions of a polymerized monoolefinic aliphatic olefin monomer that contains from 2 to about 8 carbon atoms, the solution may be advantageously heated in preheater 10 to about 220 to 250° C. at about 100 to 150 p.s.i.g. and flashed to a pressure of about 15 to 50 p.s.i.g. and a temperature of about 165 to 195° C. or so. The inlet pressure and temperature of heating zone 12 will correspond closely to the pressure and temperature after flashing. The temperature of the heating zone 12, as previously indicated, is above the vaporization temperature of the solvent and beneficially between about 200 and 260° C. Ordinarily, the receiving chamber 16 is maintained near atmospheric pressure but may be higher or lower. The temperature of heating zone 20 is usually maintained about the same as the temperature in heating zone 12 but may be maintained 25 to 100 centigrade degrees above the temperature of heating zone 12. Receiving chamber 21 is operated at subatmospheric pressure and preferably at a vacuum of 0.1 to 3 mm. mercury.

If desired, capillary tubes may be fabricated at the entrance to each passage of the multi-passage heating zone 12 which assist in stabilizing flow through the zone. These capillary tubes are usually about $\frac{1}{16}$ inch to $\frac{1}{8}$ inch in diameter and 1 inch long, but can be of any convenient length.

As indicated, the invention is applicable to recovering polymer from suspensions and slurries when temperatures above the melting point of the polymer are employed. Although true "solutions" may not be involved (due to possible phasing and the like) a liquid mass results which, for the purposes at hand, may be referred to as a solution.

The invention is further illustrated in and by the following examples in which all parts and percentages are by weight unless otherwise specified.

*Example 1*

A solution of polypropylene in xylol containing 8.6 percent polymer by weight (molecular weight about 370,000) at a temperature of about 140° C. was metered at a rate of about 114 lbs. per hr. through the tubes of a preheater which consisted of a shell and tube heat exchanger. "Dowtherm E" (DTE) vapor was condensed in the shell side at a temperature of 231° C. and the polymer solution emerged at a temperature of 227° C. A pressure of 108 p.s.i.g. was held on the solution by means of a motorized needle valve operated by a standard pressure indicator controller. After flashing to a pressure of 21 p.s.i.g. and a temperature of 174° C. the vapor liquid mixture was forced into the tubes of a shell and tube heat exchanger serving as the heating zone of the first stage of a two-stage devolatilizer. The resulting two-phase or foam mixture calculated to be about 70.1 lbs. per hr.

of liquid of which about 14 percent was polymer and about 43.7 lbs. per hr. of xylol vapor. Each tube of the heating zone heat exchanger contained a ⅛ in. x 1 in. capillary at the inlet, and the tubes were set vertically.

The polymer discharged into a receiver which was held at 4 p.s.i.g. where the vapor was withdrawn into a condensing system. The polymer solution, about 83.6 percent polymer, was forwarded by pumping means to the second stage of the devolatilizer at a rate of about 11.7 lbs. per hr. at a temperature of 170° C.

The heating zone of the second stage also consisted of a vertically mounted shell and tube heat exchanger. "Dowtherm E" vapor condensing at a temperature of 240° C. was used to heat the tubes. The heated polymer solution was discharged from the tubes at 238° C. into a receiver held at 0.2 mm. Hg absolute from which vaporized solvent was withdrawn. Subsequently, the recovered polypropylene, in molten condition, was unloaded with a pump and extruded into a water bath forming strands which were cut into pellets. Analysis after extrusion showed the polymer to contain 0.02 percent volatiles. The product, which had a molecular weight of about 290,000, was clear and of good quality.

Example 2

In the same equipment as described in Example 1, a xylol solution of polypropylene (molecular weight about 383,000) at a concentration of about 6.3 percent by weight polypropylene was fed at a rate of about 135 lbs. per hr. into the preheater. The solution was heated to 242° C. at a pressure of 138 p.s.i.g. and then flashed to a temperature of 171° C. The pressure after the flash was 27 p.s.i.g. which indicated about 71.0 lbs. per hr. of vapor was formed and the liquid phase had a concentration of about 13.3 percent polymer.

The mixture flowed through the ⅛ in. x 1 in. capillaries into the first stage heat exchanger tubes which had a wall temperature of 243° C. and was then discharged into the receiver (4 p.s.i.g.). The vapor was withdrawn and forwarded to a solvent recovery system. The liquid phase was withdrawn from the receiver at a temperature of 193° C. and analyzed about 90.0 percent polymer. About 9.45 lbs. per hr. of this polymer solution were delivered to the second stage which had "DTE" vapor condensing in the shell at 242° C. The polymer was discharged from the tubes at a temperature of 240° C. into the receiver which was held at 0.3 mm. Hg absolute. Vapor was withdrawn from the receiver as before. Devolatilized polypropylene was obtained at a rate of about 8.5 lbs. per hr.

The extruded product had 0.02 percent volatiles and a molecular weight of about 246,000. The color and physical properties were excellent.

Example 3

According to the procedure of Example 1, a solution of 8 percent polypropylene (molecular weight about 450,000) in xylol was heated in the preheater to 240° C. at a pressure of 125 p.s.i.g. at a rate of about 163 pounds per hour. The solution was flashed through the valve to a temperature of 213° C. and a pressure of 68 p.s.i.g. and then delivered through an orifice to a point a few inches above the tubes of the first stage heat exchanger. The temperature after the orifice was 188° C. (34 p.s.i.g.) and the calculated quantity of vapor at this point was about 60 pounds per hour. The liquid phase calculated to be about 12.7 percent polymer.

The mixture was then passed through the tubes of the heat exchanger of the first stage, which, in this case had no capillaries at the inlets. With the wall temperature at 240° C., the mixture emerged into the receiver (2 p.s.i.g.) at a temperature of 232° C. and the liquid phase analyzed about 92 percent polymer.

The solution was then pumped through the exchanger of the second stage with the tubes at 240° C. and emerged into the receiver (0.2 mm. Hg) at 238° C. at a rate of about 13 pounds per hour of polymer.

The extruded product had 0.04 percent volatiles and a molecular weight of about 340,000. Color and physical properties were excellent.

Example 4

Following the same general procedure as in Example 1 excepting to eliminate the preheating and flashing of the polymer solution, fifty pounds per hour of about an 8 percent polypropylene solution in xylol was fed directly to the top of the tube and shell heat exchanger of the first stage at a temperature of 140° C. and a pressure of 5 p.s.i.g. The shell side contained "Dowtherm E" condensing at 240° C. Gross bypassing or channeling into the receiver, which was maintained at one atmosphere was observed. The temperature of the mixture emerging from the tubes was erratic varying from 140 to 180° C. Samples of the liquid phase varied in concentration from 30 to 90 percent polymer with a "mix" concentration averaging about 65 percent.

The liquid phase was forwarded with difficulty to the second stage heat exchanger which operated at 240° C. A vacuum of 1 mm. Hg absolute was maintained in the receiver (average). The receiver pressure fluctuated and the extruded polymer varied in volatile content from 0.1 percent to 0.5 percent.

Eventually, the receiver of the first stage flooded and operation had to be terminated.

Certain other modifications of the present invention can be readily entered into without substantially departing from its intended spirt and scope. Therefore, it is to be understood that the invention is not to be limited or particularly construed by the foregoing specifically delineated preferred embodiments, but rather, it is to be viewed by what is defined in the hereto appended claims.

What is claimed is:

1. A process for concentrating a relatively dilute polymer solution consisting essentially of a thermoplastic polymer and a solvent for said polymer comprising heating said dilute polymer solution at an elevated pressure in a closed system filled with said dilute polymer solution to a temperature above the vaporization temperature of said solvent at a pressure lower than the pressure in said closed system; flashing said heated dilute solution to a lower pressure than in said closed system to created a two-phase mixture of vapor and liquid; introducing said mixture to a multi-passage heating zone, said zone being maintained at a temperature above the vaporization temperature of said solvent at the pressure in said zone, above the melting point of said polymer and below the temperature at which any substantial decomposition of the polymer will occur; passing said mixture through said heating zone; discharging said mixture from said zone into a receiver; withdrawing vaporized solvent from said receiver; and withdrawing from said receiver a polymer solution significantly richer in said polymer than said dilute polymer solution.

2. A process for recovering polymer from a relatively dilute polymer solution consisting essentially of a thermoplastic polymer and a solvent for said polymer comprising, heating said dilute polymer solution at an elevated pressure in a closed system filled with said dilute polymer solution to a temperature above the vaporization temperature of said solvent at a pressure lower than the pressure in said closed system; flashing said heated dilute solution to a lower pressure than in said closed system to create a two-phase mixture of vapor and liquid; introducing said mixture to the top of an essentially vertical multi-passage heating zone, said zone being maintained at a temperature above the vaporization temperature of said solvent at the pressure in said zone, above the melting point of said polymer and below the temperature at which any substantial decomposition of the polymer will occur; passing said mixture through said heating zone; discharging said mixture from said heating zone into a receiver, and withdrawing vaporized solvent from said receiver; forwarding the partially devolatilized polymer solution from said receiver to the top of a second essentially vertical heating zone, said second zone being maintained at a temperature above the vaporization temperature of said solvent at the pressure in said second zone, above the melting point of said polymer and below the temperature at which any substantial decomposition of said polymer will occur; passing said partially devolatilized polymer solution through said second heating zone; discharging from said second heating zone into a second receiver a mixture of said solvent in vaporized form and said polymer; withdrawing said vaporized solvent from said second receiver; and subsequently recovering said polymer in molten form essentially completely free of said solvent.

3. The method of claim 2, wherein said thermoplastic polymer is a normally solid hydrocarbon polymer having as an essential constituent recurring units of a polymerized 2 to about 8 carbon atom olefin monomer.

4. The method of claim 2, wherein said thermoplastic polymer is polymer having as an essential constituent recurring units of polymerized styrene.

5. In a process wherein a normally solid hydrocarbon polymer obtained by polymerizing a 2 to about 8 carbon atom monoolefin in the presence of a liquid hydrocarbon that is a solvent for said polymer and said polymer is obtained in a relatively dilute solution in said solvent in polymer concentrations between about 0.5 and 30 weight percent, the improvement which comprises, heating said dilute polymer solution at an elevated pressure in a closed system filled with said dilute polymer solution to a temperature above the vaporization temperature of said solvent at a pressure lower than the pressure in said closed system but below the temperature at which any substantial polymer decomposition will occur; flashing said heated dilute solution through an orifice into the head space of a heating zone, said head space maintained at a lower pressure than said closed system, to create a two-phase mixture of vapor and liquid, said heating zone comprising a plurality of individual, equal length, essentially vertical chambers; maintaining said heating zone at a temperature above the vaporization temperature of said solvent, above the melting point of said polymer and below the temperature at which any substantial decomposition of said polymer will occur; passing said mixture through said heating zone and discharging said mixture into a receiver maintained at essentially atmospheric pressure; withdrawing vaporized solvent from said receiver; forwarding the partially devolatilized polymer solution from said receiver to the top of a second heating zone comprising a plurality of individual, equal length, essentially vertical chambers; maintaining the temperature of said second heating zone above the vaporization temperature of said solvent, above the melting point of said polymer and below the temperature at which any substantial decomposition of said polymer will occur; passing said partially devolatilized polymer of said solution through said second heating zone and discharging it from said second heating zone into a second receiver maintained at subatmospheric pressure; withdrawing vaporized solvent from said second receiver; recovering said polymer in molten condition essentially completely free of said solvent; and subsequently cooling said polymer to a normal temperature.

6. The method of claim 5, wherein said monoolefin polymer is an ethylene polymer.

7. The method of claim 5, wherein said monoolefin polymer is a propylene polymer.

8. The process for recovering a normally solid propylene polymer from dilute solution in an aromatic hydrocarbon solvent selected from the group consisting of benzene, toluene and xylol and mixtures thereof wherein the polymer concentration is between about 5 and 20 weight percent, which process comprises heating said dilute polymer solution at a pressure between about 100 and 150 p.s.i.g. in a closed system filled with said dilute polymer solution to a temperature between about 200 and 250° C.; flashing said heated dilute solution through an orifice into the head space of a heating zone, said head space maintained at a pressure between about 5 and 50 p.s.i.g., to create a two-phase mixture of vapor and liquid, said heating zone comprising a plurality of individual, equal length, essentially vertical chambers; maintaining said heating zone at a temperature between about 200 and 260° C.; passing said mixture through said heating zone and discharging said mixture into a receiver maintained at essentially atmospheric pressure; withdrawing vaporized solvent from said receiver; forwarding the partially devolatilized polymer solution from said receiver to the top of a second heating zone comprising a plurality of individual, equal length, essentially vertical chambers, said second heating zone being maintained at a temperature between about 200 and 290° C.; passing said partially devolatilized polymer solution through said heating zone and discharging it into a second receiver maintained at subatmospheric pressure; withdrawing vaporized solvent from said second receiver; recovering said propylene polymer in molten condition having less than 0.1 weight percent volatile content; and subsequently cooling and solidifying said molten propylene polymer.

9. The process of claim 8, wherein said propylene polymer is polypropylene.

10. The process of claim 8, wherein said propylene polymer is a copolymer of ethylene and propylene.

11. The process of claim 8, wherein said dilute solution is a solution of about 5 to 20 weight percent polypropylene in xylol.

12. The process of claim 8, wherein said dilute solution is a solution of about 5 to 20 weight percent of a copolymer of ethylene and propylene in xylol.

References Cited by the Examiner

UNITED STATES PATENTS

| | | | |
|---|---|---|---|
| 2,727,884 | 12/55 | McDonald et al. | 23—285 |
| 2,742,083 | 4/56 | Henszey. | |
| 2,848,493 | 8/58 | Dewling et al. | |
| 2,899,401 | 8/59 | Eby. | |
| 2,944,040 | 7/60 | Pollock et al. | 260—34.2 |
| 2,992,679 | 7/61 | Twaddle | 159—2 |
| 3,036,057 | 5/62 | Wallace. | |

FOREIGN PATENTS

| | | |
|---|---|---|
| 450,545 | 6/43 | Belgium. |

MORRIS LIEBMAN, *Primary Examiner.*

LEON J. BERCOVITZ, *Examiner.*